United States Patent [19]
Pfeiffer

[11] Patent Number: 5,786,913
[45] Date of Patent: Jul. 28, 1998

[54] OPTICAL TDMA RING NETWORK WITH A CENTRAL TRANSMITTING AND RECEIVING DEVICE

[75] Inventor: Thomas Pfeiffer, Stuttgart, Germany

[73] Assignee: Alcatel NV, Netherlands

[21] Appl. No.: 688,844

[22] Filed: Jul. 31, 1996

[30] Foreign Application Priority Data

Aug. 10, 1995 [DE] Germany ................. 195 29 376.2

[51] Int. Cl.[6] ............................. H04B 10/20; H04J 14/00
[52] U.S. Cl. .................. 359/119; 359/140; 359/167; 370/460
[58] Field of Search .................... 359/119, 137, 359/139–140, 167; 370/460

[56] References Cited

U.S. PATENT DOCUMENTS

| | | | |
|---|---|---|---|
| 4,713,807 | 12/1987 | Caves et al. | 370/460 |
| 4,763,325 | 8/1988 | Wolfe et al. | 370/104 |
| 4,922,479 | 5/1990 | Su | 370/1 |
| 5,086,349 | 2/1992 | Okayama et al. | 359/124 |
| 5,239,399 | 8/1993 | Evans, Jr. et al. | 359/117 |
| 5,537,393 | 7/1996 | Shioda et al. | 359/119 |
| 5,583,855 | 12/1996 | Ball | 370/460 |

FOREIGN PATENT DOCUMENTS

| | | | |
|---|---|---|---|
| 0471414 | 2/1992 | European Pat. Off. | 359/119 |
| 0385430 | 8/1994 | European Pat. Off. | |
| 3007958 | 9/1981 | Germany . | |
| 3151093 | 7/1983 | Germany . | |
| 3214277 | 10/1983 | Germany . | |
| 3603767 | 8/1986 | Germany . | |
| 3726660 | 2/1989 | Germany | 359/119 |
| 4114485 | 11/1992 | Germany . | |
| 4237735 | 1/1994 | Germany . | |
| 4335480 | 5/1994 | Germany . | |
| 0123248 | 9/1980 | Japan | 359/119 |

OTHER PUBLICATIONS

"Introduction of the WDM Technique in SDH Networks" by Tillerot et al. International Switching Symposium, Apr. 1995, vol. 2, pp. 392–396.

"Optical Lan Using Distance Multiplexing and Reflection Modulation", Electronics Letters, Sep. 1, 1994, vol. 30, pp. 1506–1507, by M. Leich et al.

"High-Speed III-V Semiconductor Intensity Modulators" by Robert Walker, IEEE Journal of Quantum Electronics, vol. 27, No. 3, Mar., 1991, pp. 654–667.

Propagation of Signal and Noise in Concatenated Erbium-Doped Fiber Optical Amplifers by C. Giles, et al, Optical Amplifiers, vol. 9, No. 2, Feb. 1991, pp. 147–154.

*Primary Examiner*—Kinfe-Michael Negash
*Attorney, Agent, or Firm*—Ware, Fressola, Van Der Sluys & Adolphson LLP

[57] ABSTRACT

An optical ring network with a plurality of network elements (#1, . . . , #N) is disclosed which contains only a single laser diode (2). This laser diode (2) is controlled to produce optical pulses of constant repetition frequency. Each network element (#1, . . . , #N) includes an add-drop facility by which the optical pulses (data bits) are selectively added to or extracted from an optical data stream.

10 Claims, 2 Drawing Sheets

OPTICAL TDMA RING NETWORK WITH A CENTRAL TRANSMITTING AND RECEIVING DEVICE

TECHNICAL FIELD

The present invention relates to an optical ring networks and to optical add-drop facilities.

BACKGROUND OF THE INVENTION

Optical networks are well known. For example, a publication by F. Tillerot et al, "Introduction of the WDM Technique in SDH Networks", XV International Switching Symposium ISS'95, April 1995, Vol. 2, Contribution C 7.5, pp. 392 to 396, describes an optical network in which two network elements (node 1, node 2) and a central network element (central node) are arranged as a ring (FIG. 5). The central network element has a transmitting part and a receiving part. The transmitting part consists of four multi-electrode DFB laser diodes emitting at different wavelengths (four wavelengths), so that at least four network elements can be addressed. Each network element also has a transmitting part and a receiving part which are connected to an add-drop multiplexer. A laser diode in the transmitting part of the first network element (node 1) emits at a fifth wavelength, and a laser diode in the transmitting part of the second network element (node 2) emits at a sixth wavelength. These six laser diodes generate light with an optical power spectrum as shown in FIG. 6. Power differences between different wavelengths are explained by a wavelength dependence of the gain of the fiber-optic amplifier (EDFA).

Such an optical ring network is suitable for signal transmission using combined time- and wavelength-division multiplexing (T/WDM). A subscriber unit and an access node configuration for this are shown in FIGS. 7 and 8.

Efforts are being made to further increase the bit rate in optical transmission systems, e. g., in the T/WDM ring network mentioned above, to above 10 Gb/s. This presents several technical problems, however. For example, the laser diodes must be capable of producing short optical pulses (<100 ps at 10 Gb/s). This places more stringent requirements on the laser diodes and, thus, adds to the costs of the optical network. In addition, special attention must be directed to the wavelength used: The wavelengths of the optical signals produced by the individual laser diodes must not be too far apart, since the optical signals, particularly at high bit rates, should be subject to similar propagation conditions in terms of dispersion. Furthermore, at the above-mentioned high bit rate, the wavelengths must be close to the zero dispersion wavelength of the optical fiber. This necessitates a complicated and costly selection of the laser diodes.

An optical network which requires only a single laser diode is known from an article by M. Leich et al, "Optical LAN using distance multiplexing and reflection modulation", Electronics Letters, 1st Sep. 1994, Vol. 30, No. 18, pp. 1506 to 1507. This optical network has a star structure, i. e., the single laser diode is located centrally at a reflective star coupler which is connected to several network elements by respective optical fibers. The network elements are arranged on concentric circles around the reflective star coupler (FIG. 1). Thus, time-division multiplexing (TDMA) can be performed in this optical network. Every network element modulates an incoming pulse and then reflects it to the reflective star coupler. For this, it comprises a transmitter and a receiver which are each fed with a part of the incoming pulse; through the transmitter and receiver, an add-drop function is provided.

The transmitter has an optical amplitude filter (NLMZI), a delay line (DL), an electro-optical switch (EOS), and a reflector. The receiver also has an optical amplitude filter (NLMZI) and a delay line (DL), and further comprises an optical AND gate and a photodetector (PD). Through the delay lines, the distances to the central reflective star coupler can be adapted, so that each network element has access to "its" time slot.

The devices (reflective star couplers, transmitters and receivers) described for this optical network, which requires only one laser diode (and, thus, light of only one wavelength), are only usable in such an optical star network; an optical ring network cannot be implemented with them.

Optical networks (ring network, star network) use add-drop facilities to extract information from an optical data stream and insert information into the optical data stream in a network element. An all-optical add-drop facility is disclosed in Patent Specification EP-B1-0 385 430. The add portion of this add-drop facility comprises an optical timing adjusting means, a pulse width reducing means, and an optical transmitter. The optical timing adjusting means includes a frame extracting circuit for extracting a frame pulse from a pulse train. Use is made of an optical filter to assign a separate wavelength to the optical frame pulse. The pulse width reducing means includes an optical threshold element which develops an optical output only when the optical input exceeds a threshold level. The drop portion of the add-drop facility comprises a pulse width expanding means, which is connected to the optical timing adjusting means, and an optical receiver. The pulse width expanding means also includes an optical threshold element.

The prior-art optical add-drop facility briefly described in the foregoing generates an optical frame pulse. This requires the optical timing adjusting means, which includes the optical filter and a delay element.

SUMMARY OF THE INVENTION

It is an object of the invention to provide an optical ring network in which the aforementioned complicated and costly selection of the laser diodes with regard to wavelength is not necessary and in which a simple add-drop facility can be used. Such an optical ring network comprises a center and a plurality of network elements, each of the network elements comprising a facility whereby information can be added to and extracted from an optical data stream, characterized in that the center comprises a single laser which produces optical pulses of a predetermined pulse repetition frequency, so that between every two successive optical pulses a usable time interval is defined into which the network elements can insert information and from which the network elements can extract information. Such an add-drop facility for an optical network is characterized in that the facility comprises an optical branching element which divides an incoming optical data stream between two branches, that in the second branch the facility comprises modulating means which block or pass and delay optical pulses of a predetermined pulse repetition frequency in response to a control signal, that the facility comprises an optical coupler which couples each passed and delayed optical pulse partly to a third branch and partly to the first branch to thereby add information to the optical data stream, and that the optical coupler couples part of the optical data stream propagating in the first branch to the third branch, which contains detecting means for detecting information to be extracted from the optical data stream.

One advantage of the invention is that an electro-optic modulator contained in a network element only needs to be designed for a low bit rate even if a data stream transmitted in the optical ring network has a high bit rate, e. g., a bit rate of 10 Gb/s.

Another advantage is that subsequent changes to the optical ring network are possible without the need to replace individual network elements. It suffices, for example, to adapt the single laser in the central network element so that it will produce shorter optical pulses, thus making it possible to increase the bit rate of the data stream in the ring network by adding further network elements.

BRIEF DESCRIPTION OF THE DRAWINGS

The invention will now be explained in more detail with reference to the accompanying drawings, in which.

BEST MODE FOR CARRYING OUT THE INVENTION

Figure 1:
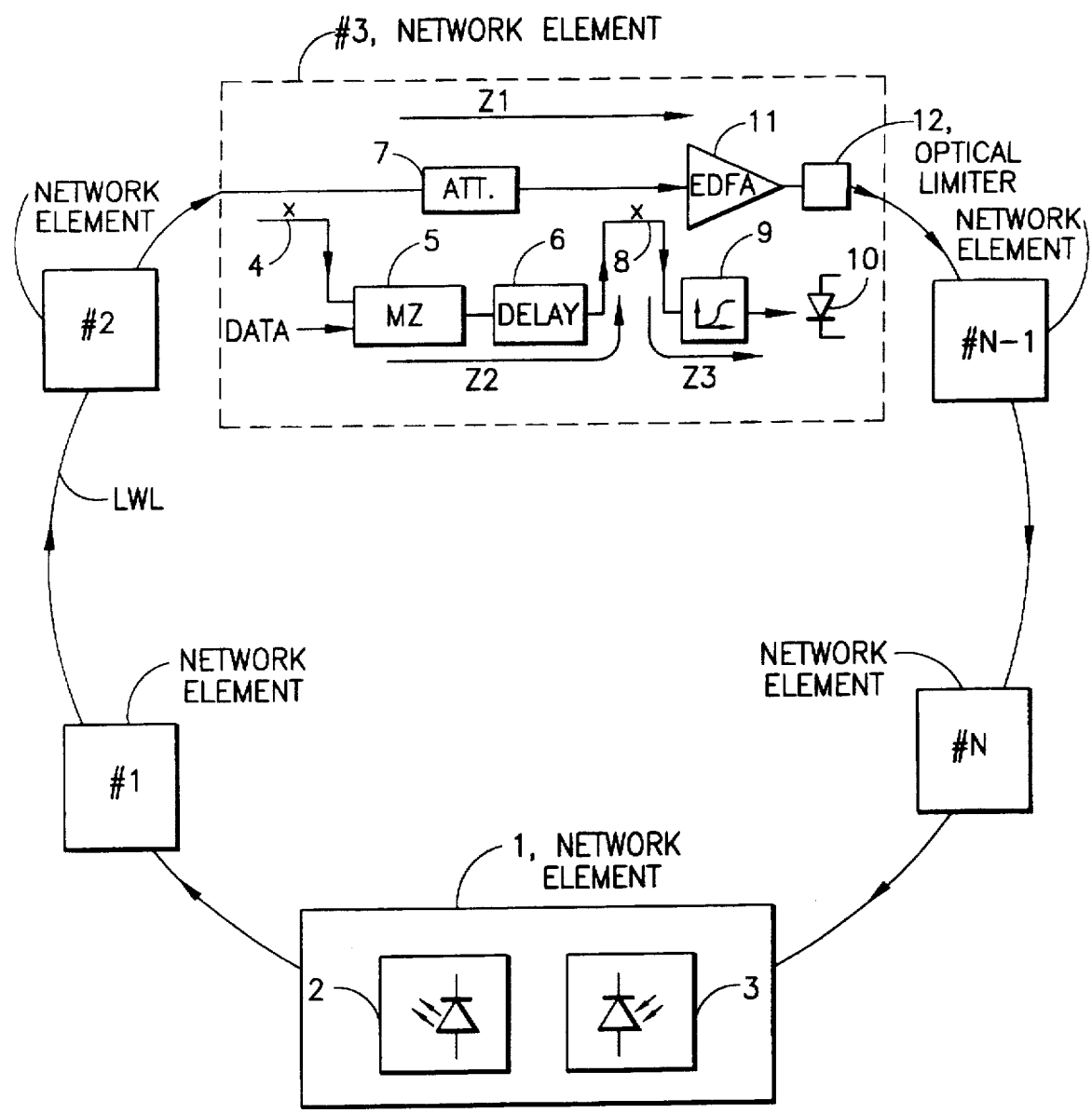
FIG. 1 is a schematic representation of an optical ring network.

FIG. 1 shows schematically an optical ring network in which a central network element 1 and a number of network elements #1, ..., #N are interconnected by an optical fiber LWL. The central network element 1 will hereinafter be referred to as center, which is a transmitting and receiving device. The center 1 has an optical transmitter 2 and an optical receiver 3 which are so connected to the optical fiber LWL that light emitted by the optical transmitter 2 is coupled into one end of the optical fiber LWL and received by the optical receiver 3 at the other end of the optical fiber LWL. The optical transmitter 2 comprises, for example, a laser diode (e. g., a DFB laser) which ideally emits monochromatic light, and a controller (not shown in FIG. 1) for controlling the laser diode. Instead of the laser diode, a fiber-optic laser or another monochromatic source can be used. The laser diode is controlled in such a way that the emitted light is a train of optical pulses. A measure of the time interval between the individual optical pulses is the pulse repetition frequency.

As will be explained in more detail below, according to the invention, only a single laser diode is needed in the optical ring network. The optical transmitter 2 and the laser diode contained therein must therefore be so chosen that the selected pulse repetition frequency is constant, that the wavelength of the emitted light is optimally adapted to any fiber-optic amplifiers which may be present, and that the duration of the individual optical pulses is as short as possible. Values for such parameters are, for example: a pulse repetition frequency of 155 MHz, so that a "time window" of 6.43 ns is obtained, a wavelength of 1.55 µm, and a pulse duration of <100 ps.

The optical ring network shown need not necessarily be a closed ring, but the invention is, of course, also applicable to an unclosed ring. In that case, the optical transmitter 2 will be spatially separated from the optical receiver 3; and in that case, too, only a single laser diode is required.

In the optical ring network shown in FIG. 1, each network element #1, ..., #N has an add-drop facility, shown schematically and by way of example in the network element #3 for all the network elements #1, ..., #N. By means of this add-drop facility, optical pulses (data bits) can be selectively added to or extracted from an optical data stream at a network element #1, ..., #N. Accordingly, the optical data stream, which consists of optical pulses, has a bit rate (e. g., 10 Gb/s) which is greater than the pulse repetition frequency (155 MHz).

Figure 2:
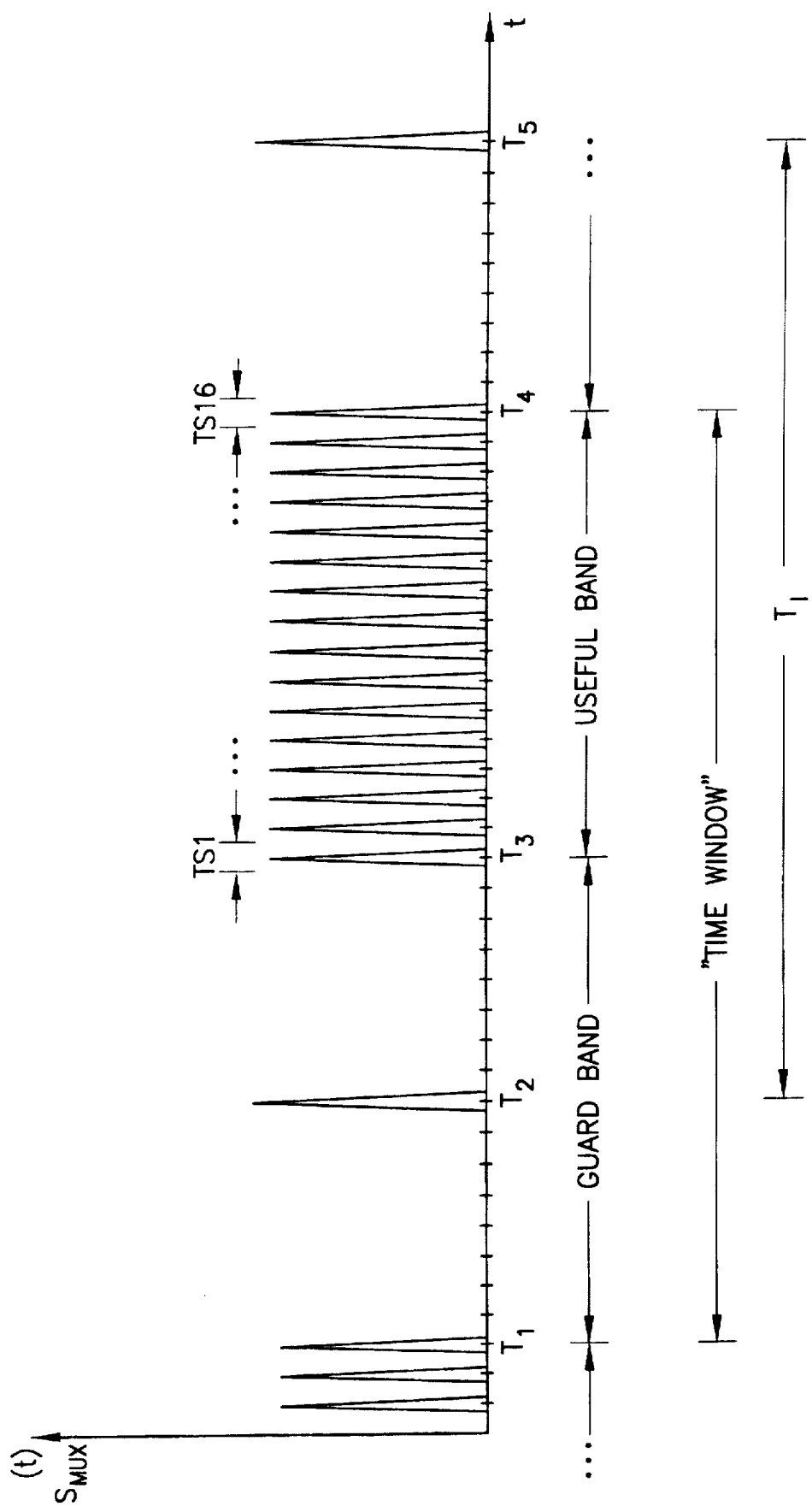
FIG. 2 is a graph of a time-division multiplex signal.

In the following, the construction of the add-drop facility shown in the network element #3 will be described before the operation of the optical ring network is explained with reference to FIG. 2.

The optical fiber LWL contains an optical branching element 4 having two outputs, so that an optical data stream arriving at an input of network element #3 will be divided between two branches Z1, Z2. One output is connected to an input of an optical attenuator 7, and another output is connected to one input of an optical switch 5. Another input of the optical switch 5 can be supplied with a control signal, designated "Data" in FIG. 1. An output of the optical switch 5 is coupled to an input of an optical delay line 6 which has its output connected to one input of an optical coupler 8. Another input of the optical coupler 8 is connected to an output of the optical attenuator 7. One output of the optical coupler 8 is connected to an optical decision device 9, whose output is coupled to a photodetector 10. Another output of the optical coupler 8 is connected to an optical amplifier 11, designated as "EDFA" in FIG. 1. An output of the optical amplifier 11 is coupled to an optical limiter 12 which is connected to the optical fiber LWL. Thus, an output of network element #3 is connected to the next network element #N-1.

In the add-drop facility, the optical coupler 8 defines a third branch Z3, which contains the optical decision device 9 and the photodetector 10 as detecting means. The photodetector 10 converts received optical pulses to electric pulses, which are evaluated in a signal processor (not shown).

FIG. 1 shows the branches Z1, Z2, Z3 formed by the optical branching element 4 and the optical coupler 8. Branch Z1 connects the input of network element #3 to the output of network element #3. It contains the optical attenuator 7, the optical amplifier 11, and the optical limiter 12. The optical attenuator 7 is inserted between the optical branching element 4 and the optical coupler 8, and the optical amplifier 11 and the optical limiter 12 between the optical coupler 8 and the output of network element #3.

Branch Z2 connects one output of the optical branching element 4 to one input of the optical coupler 8; it contains the optical switch 5 and the delay line 6 as modulating means.

The devices used in the add-drop facility are well known, so that they will be explained only briefly:

The optical branching element 4 and the optical coupler 8 are 3-dB fiber couplers, for example (see book by G. Grau, "Optische Nachrichtentechnik", 2nd ed., Springer-Verlag Berlin, 1986, ISBN 3-540-15802-2, Chapter 7.3.3, pp. 296 to 302).

The optical attenuator 7 is, for example, a commercially available optical attenuator.

The optical switch 5 is, for example, an electro-optic modulator (a Mach-Zehnder modulator) which can be controlled by an electric control signal to either block or pass light; it thus performs the function of an electrically controlled optical switch (see R. G. Walker, "High-Speed III–V Semiconductor Intensity Modulators", IEEE Journal of Quantum Electronics, Vol. 27, No. 3, March 1991, pp. 654 to 667).

The optical delay line 6 is, in the simplest case, a section of optical fiber. Light requires a certain time, a delay time, to propagate through this section of optical fiber. Through the length of the section of optical fiber, the delay time can be set as desired.

The optical amplifier 11 is, for example, an erbium-doped fiber optical amplifier (EDFA) (see IEEE Journal of Lightwave Technology, Special Issue on Optical Amplifiers, Vol. 9, No. 2, February 1991, e. g. pp. 147 to 154) which compensates for losses of optical power.

The optical limiter 12 is preferably a section of optical fiber with a nonlinear absorption characteristic, i. e., high optical powers are absorbed more than small optical powers. Such an optical limiter is disclosed in DE-A1-42 29 292: A section of optical fiber is so doped that two-photon absorption takes place therein. The optical limiter 12 limits the optical power of the individual optical pulses of the data stream to a predetermined level.

The optical decision device 9 is a nonlinear optical absorber, i. e., light emerges at the output only if the optical input power exceeds a predetermined threshold. Such an optical decision device 9 is known, for example, from Patent Specification EP-B1-0 385 430, already referred to above in connection with the all-optical add-drop facility.

In FIG. 1, the optical amplifier 11 and the optical limiter 12 are shown as two discrete components. It is also known, however, that optical amplifiers and semiconductor optical amplifiers can both amplify and limit optical signals. This can be accomplished by selecting a suitable operating point. If the operating point is so chosen that the optical amplifier goes into saturation from a predetermined optical input power, the desired limiting will be provided. If the optical amplifier 11 is operated in this manner, no optical limiter is required.

Instead of inserting the optical decision device 9 and the photodetector 10 in the branch Z3, a passive optical network, for example, may be connected to the branch Z3. In that case, the optical decision device 9 and the photodetector 10 may, under certain circumstances, form part of an optical subnetwork connected to network element #3. This does not affect the actual function of the add-drop facility.

The operation of the optical ring network will now be explained with reference to FIG. 2, which shows a time-division multiplex signal $S_{MUX}(t)$ as a function of time t. The optical transmitter 2 regularly produces optical pulses having a constant pulse spacing $T_1$. In FIG. 2, two of these optical pulses are shown hatched at times $T_2$ and $T_5$ ($T_2<T_5$), and a "time window" is defined which has a length of, e. g., 6.43 ns, corresponding to a pulse repetition frequency of 155 MHz. To distinguish these optical pulses produced by the optical transmitter 2 from further optical pulses (data bits), they will hereinafter be referred to as optical central pulses. Symmetrically about these optical central pulses, a guard band to be kept free from optical pulses is defined. Beside the guard band, an adjoining usable time period is defined, which will hereinafter be referred to as useful band. Guard band and useful band together form the "time window". With $T_1<T_2<T_3<T_4<T_5$ as shown in FIG. 2, the guard band lies between $T_1$ and $T_3$, the useful band between $T_3$ and $T_4$, and the "time window" between $T_1$ and $T_4$. Accordingly, the pulse spacing $T_1$ is equal to the "time window".

If, in FIG. 1, the number of network elements is equal to 16, i. e., N=16, the useful band must be divided into 16 time slots TS1, ..., TS16; each network element #1, ..., #N is assigned one time slot TS1, ..., TS16, which is determined by the optical delay line 6. Each network element #1, ..., #N can insert one (optical) data bit into the time slot TS1, ..., TS16 assigned to it. In FIG. 2, all 16 network elements have already inserted a data bit into their respective time slots. This is done as follows. The optical branching element 4 couples out part of the incoming optical power, regardless of whether this is the optical power of an optical central pulse or that of an optical data bit (a logic 1) of another network element. The part not coupled out is attenuated by the optical attenuator 7. The electro-optic modulator 5 is designed to allow light to pass only if a bit of the data signal is a logic 1.

Thus, data bits which were inserted into the time slots TS1, ..., TS16 by other network elements #1, ..., #N are extracted as well. However, each network element #1, ..., #N uses only the optical central pulses to transmit the data signal. A data source providing the data signal is therefore synchronous with the optical central pulses, because only the optical central pulse is to be modulated, i. e., passed or blocked, by the electro-optic modulator 5. A passed optical central pulse is delayed by the optical delay line 6 so as to occupy the time slot assigned to the network element. The optical coupler 8 adds this passed and delayed optical central pulse to the part not coupled out.

Each network element #1, ..., #N can also extract data (data bits) from the useful bond. This is done as follows. The optical coupler 8 couples out part of the optical data stream attenuated by the attenuator 7, and feeds this part to the optical decision device 9. The optical coupler 8 also couples out part of the optical central pulse delayed by the optical delay device 6, and feeds this part to the optical decision device 9. The delayed optical central pulse, as mentioned above, determines the time slot from which information (data bit) is extracted. At this time (if the data bit is a logic 1), an optical power above the predetermined threshold level enters the optical decision device 9, which results in light emerging from the optical decision device 9. If the bit is a logic 0, the optical power is below the predetermined threshold level. Thus, the information destined for this network element can be extracted.

The time-division multiplex signal $S_{MUX}(t)$ is received and evaluated by the optical receiver 3 (FIG. 1). The optical receiver 3 must be suitable for receiving an optical signal of high bit rate, since in the useful band the information contained in the data stream has a bit rate (here an overall bit rate of 10 Gb/s, for example) greater than the pulse repetition frequency (e. g., 155 MHz) of the optical central pulses. The optical receiver 3, like the individual network elements #1, ..., #N, is synchronous with the optical central pulses. In the optical receiver 3, the optical central pulses can thus be distinguished from the optical data stream. This also ensures that an assignment of network elements #1, ..., #N to the time slots TS1, ..., TS16 is unambiguous.

If the overall bit rate is to be further increased in the optical ring network, i. e., if further network elements are to be inserted into the optical ring network, it suffices, for example, to replace the central optical transmitter 2 by another transmitter which produces shorter optical pulses. This results in the time slots TS1, ..., TS16 being shortened, so that in the useful band, room is made for the added network elements.

What is claimed is:

1. An optical ring network comprising,
   a center (1) having a laser (2) which produces an optical data stream, the optical data stream including optical pulses of a predetermined pulse repetition frequency, a useable time interval being defined between every two successive optical pulses; and
   a plurality of network elements (#1, ..., #N), each of the network elements (#1, ..., #N) being passive elements which do not contain a laser, each of the network elements (#1, ..., #N) being responsive to the optical data stream and comprising a facility whereby information can be added to and extracted from each useable time interval of the optical data stream.

2. An optical add-drop facility for an optical network, particularly for an optical ring network as claimed in claim 1, characterized in that the facility comprises an optical branching element (4) which divides the incoming optical data stream between two branches (Z1, Z2), that in the second branch (Z2) the facility comprises modulating means (5, 6) which block or pass and delay optical pulses of the predetermined pulse repetition frequency in response to a control signal, that the facility comprises an optical coupler (8) which couples each passed and delayed optical pulse partly to a third branch (Z3) and partly to the first branch (Z1) to thereby add information to the optical data stream, and that the optical coupler (8) couples part of the optical data stream propagating in the first branch (Z1) to the third branch (Z3), which contains detecting means (9, 10) for detecting information to be extracted from the optical data stream.

3. An optical add-drop facility as claimed in claim 2, characterized in that the modulating means (5, 6) consist of an optical switch (5) and an optical delay line (6), and that the detecting means (9, 10) consist of an optical decision device (9) and a photo-detector (10).

4. An optical add-drop facility as claimed in claim 3, characterized in that in the first branch (Z1) an optical attenuator (7) is provided between the optical branching element (4) and the optical coupler (8), and that the first branch (Z1) further contains an optical amplifier (11) and an optical limiter (12) which amplify the attenuated optical data stream coming from the optical coupler (8) and limit it to a predetermined maximum optical output level.

5. An optical add-drop facility as claimed in claim 2, characterized in that in the first branch (Z1) an optical attenuator (7) is provided between the optical branching element (4) and the optical coupler (8), and that the first branch (Z1) further contains an optical amplifier (11) and an optical limiter (12) which amplify the attenuated optical data stream coming from the optical coupler (8) and limit it to a predetermined maximum optical output level.

6. An optical ring network as claimed in claim 1, characterized in that the facility comprises an optical branching element (4) which divides the incoming optical data stream between two branches (Z1, Z2), that in the second branch (Z2) the facility comprises modulating means (5, 6) which block or pass and delay optical pulses of the predetermined pulse repetition frequency in response to a control signal, that the facility comprises an optical coupler (8) which couples each passed and delayed optical pulse partly to a third branch (Z3) and partly to the first branch (Z1) to thereby add information to the optical data stream, and that the optical coupler (8) couples part of the optical data stream propagating in the first branch (Z1) to the third branch (Z3), which contains detecting means (9, 10) for detecting information to be extracted from the optical data stream.

7. An optical ring network as claimed in claim 6, characterized in that the modulating means (5, 6) consist of an optical switch (5) and an optical delay line (6), and that the detecting means (9, 10) consist of an optical decision device (9) and a photo-detector (10).

8. An optical ring network as claimed in claim 7, characterized in that in the first branch (Z1) an optical attenuator (7) is provided between the optical branching element (4) and the optical coupler (8), and that the first branch (Z1) further contains an optical amplifier (11) and an optical limiter (12) which amplify the attenuated optical data stream coming from the optical coupler (8) and limit it to a predetermined maximum optical output level.

9. An optical ring network as claimed in claim 8, characterized in that the center (1) comprises an optical receiver for receiving the optical data stream.

10. An optical ring network as claimed in claim 1, characterized in that the center (1) comprises an optical receiver for receiving the optical data stream.

* * * * *